(12) United States Patent
Yang

(10) Patent No.: US 7,226,102 B2
(45) Date of Patent: Jun. 5, 2007

(54) STORAGE STRUCTURE FOR VEHICULAR TRAY

(75) Inventor: Ho-jun Yang, Anyang-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 115 days.

(21) Appl. No.: 11/108,654

(22) Filed: Apr. 19, 2005

(65) Prior Publication Data

US 2005/0275324 A1   Dec. 15, 2005

(30) Foreign Application Priority Data

Jun. 11, 2004    (KR)    ............... 10-2004-0043189

(51) Int. Cl.
*B60N 3/12* (2006.01)
(52) U.S. Cl. ............. 296/37.12; 296/37.1; 296/37.8; 224/483; 220/836
(58) Field of Classification Search ........... 296/37.1, 296/37.8, 37.9, 37.12, 37.16; 224/400, 435, 224/483; 220/827, 836; 312/321.5
See application file for complete search history.

(56) References Cited

U.S. PATENT DOCUMENTS

| | | | | | |
|---|---|---|---|---|---|
| 3,386,765 | A | * | 6/1968 | Drach, Jr. ............... | 296/37.12 |
| 4,445,720 | A | * | 5/1984 | Leaf et al. ............... | 296/37.12 |
| 4,552,399 | A | * | 11/1985 | Atarashi ................ | 296/37.12 |
| 5,050,922 | A | * | 9/1991 | Falcoff ................... | 296/37.7 |
| 5,056,846 | A | * | 10/1991 | Tanaka ................... | 296/37.1 |
| 5,413,317 | A | * | 5/1995 | Spoerre ................... | 267/134 |
| 5,701,754 | A | * | 12/1997 | Choi et al. ............... | 296/37.12 |
| 5,775,761 | A | * | 7/1998 | Asami et al. ............. | 296/37.7 |
| 5,868,448 | A | * | 2/1999 | Izumo ..................... | 296/37.1 |
| 6,003,925 | A | * | 12/1999 | Litke et al. .............. | 296/37.8 |
| 6,059,341 | A | * | 5/2000 | Jensen et al. ............. | 296/37.6 |
| 6,135,530 | A | * | 10/2000 | Blaszczak et al. ......... | 296/37.8 |
| 6,244,647 | B1 | * | 6/2001 | Allison ................... | 296/37.12 |
| 6,502,885 | B1 | * | 1/2003 | Gammon et al. ......... | 296/37.13 |
| 6,702,354 | B2 | * | 3/2004 | Galijasevic ............... | 296/37.1 |
| 6,719,348 | B1 | * | 4/2004 | Song ...................... | 296/37.16 |
| 2004/0195855 | A1 | * | 10/2004 | Takeshima ............... | 296/37.1 |
| 2005/0104400 | A1 | * | 5/2005 | You ........................ | 296/37.12 |

(Continued)

FOREIGN PATENT DOCUMENTS

JP          7-117568         5/1995

(Continued)

OTHER PUBLICATIONS

English language Abstract of JP 7-117568.

(Continued)

*Primary Examiner*—Lori L. Lyjak
(74) *Attorney, Agent, or Firm*—Greenblum & Bernstein, P.L.C.

(57) ABSTRACT

A storage structure for a vehicular tray includes a housing internally defining a receiving space configured to store contents, the housing being formed as an integral unit, a base plate closely disposed on a lower panel of the housing, the base plate being formed as a board configured to bear the contents thereon, and a holder unit including a holding support having a height configured to prevent leakage of the contents placed on the base plate, the holder unit serving as a hinge shaft of a cover to open and close the receiving space.

2 Claims, 2 Drawing Sheets

U.S. PATENT DOCUMENTS

| | | |
|---|---|---|
| 2005/0133523 A1 | 6/2005 | Kim |
| 2005/0134070 A1* | 6/2005 | Plentis et al. ............... 296/37.1 |
| 2005/0134073 A1* | 6/2005 | Tokutomi et al. .......... 296/37.8 |
| 2005/0236859 A1* | 10/2005 | Sakakibara et al. ........ 296/37.8 |
| 2005/0275235 A1* | 12/2005 | Park .......................... 296/37.8 |
| 2006/0066119 A1* | 3/2006 | Radu et al. ................. 296/37.9 |
| 2006/0186686 A1* | 8/2006 | Schmidt et al. .......... 296/37.12 |

FOREIGN PATENT DOCUMENTS

JP    2003-320901    11/2003

OTHER PUBLICATIONS

English language Abstract of 2003-320901.

* cited by examiner

STORAGE STRUCTURE FOR VEHICULAR TRAY

RELATED APPLICATIONS

The present disclosure relates to subject matter contained in Korean Application No. 10-2004-43189, filed on Jun. 11, 2004, which is herein expressly incorporated by reference its entirety.

BACKGROUND OF THE INVENTION

1. Field of the Invention

The present invention relates to a storage structure for a vehicular tray, and more particularly to a storage structure for a vehicular tray which can reduce the number of parts by the provision of a base-plate integrally formed to a lower panel of the tray, resulting in reduction in manufacturing costs and assembly steps of the parts.

2. Description of the Related Art

Generally, the term "vehicular tray" indicates a reservoir means provided inside a passenger compartment of an automotive vehicle. According to an installed position thereof, the tray is classified into a dashboard tray, a seat-side tray, a center console tray, and the like.

Now, a conventional storage structure for a vehicular tray will be explained with reference to FIG. 1.

As shown in FIG. 1, the tray 1, used to receive various contents, internally defines a receiving space 3 having a predetermined volume. The receiving space 3 is delimited by an upper panel 5, lateral panel 6, and lower panel 7.

The lower panel 7, configured as a separate part, is provided with a hook 8 at one end thereof. Below the hook 8 is provided an upwardly-protruded potion 9 for fixedly retaining the hook 8.

On the lower panel 7 is seated a base-plate 10. The base-plate 10 has upwardly inclined rear and front leak-proof extensions 12 and 14 formed at opposite ends thereof for preventing leakage of the contents placed on the base-plate 10.

The front leak-proof extension 14 is positioned adjacent to an assembled board 16 consisting of a plurality of board pieces in order to fix side dampers (not shown), and the like.

The receiving space 3 defined in the tray 1 is opened or closed by means of a cover 22. The cover 22 has a hinge shaft 20 at a lower end thereof, and an opening or closing operating speed of the cover 22 is adjustable by making use of the side dampers affixed to the assembled board 16.

In the above-described conventional vehicular tray 1, since the assembled board 16, to which the lower panel 7 delimiting the bottom of the receiving space 3 is coupled, is easily deformable, in order to prevent possible deformation of other parts, the lower panel 7 is configured as a separate part, rather than being integrally formed with the lateral panel 6 also delimiting the receiving space 3.

Further, the presence of the upwardly inclined front leak-proof extension 14, used to prevent falling and leakage of the contents laid on the base-plate 10, and the upwardly inclined rear leak-proof extension 12, used to prevent movement of the hook 8 in a fixed state, increases manufacturing costs, and provides a relatively narrow receiving space.

SUMMARY OF THE INVENTION

Therefore, the present invention has been made in view of the above problems, and it is an object of the present invention to provide a storage structure for a vehicular tray which can reduce the number of parts and the number of assembly steps of the parts by the provision of a base-plate integrally formed to a lower panel of the tray, resulting in a reduction in manufacturing costs.

It is another object of the present invention to provide a storage structure for a vehicular tray which can provide a sufficient receiving space therein and reduce manufacturing costs by eliminating the need for separate front and rear leak-proof extensions, required to prevent leakage of contents.

In accordance with the present invention, the above and other objects can be accomplished by the provision of a storage structure for a vehicular tray comprising: a housing internally defining a receiving space for storing contents, the housing being an integral unit; a base-plate closely disposed on a lower panel of the housing, and taking the form of a board suitable for bearing the contents thereupon; and a holder unit including a holding support having a prescribed height suitable for preventing leakage of the contents placed on the base-plate, the holder unit serving as a hinge shaft of a cover opening or closing the receiving space.

Preferably, the lower panel of the housing may have an upwardly-extending protrusion for fixing the base-plate in place.

With the present invention, since the housing is configured as an integral unit, it is possible to reduce the number of parts, and thus manufacturing costs thereof.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a preferred embodiment of the present invention will be explained with reference to the accompanying drawings.

Figure 1:
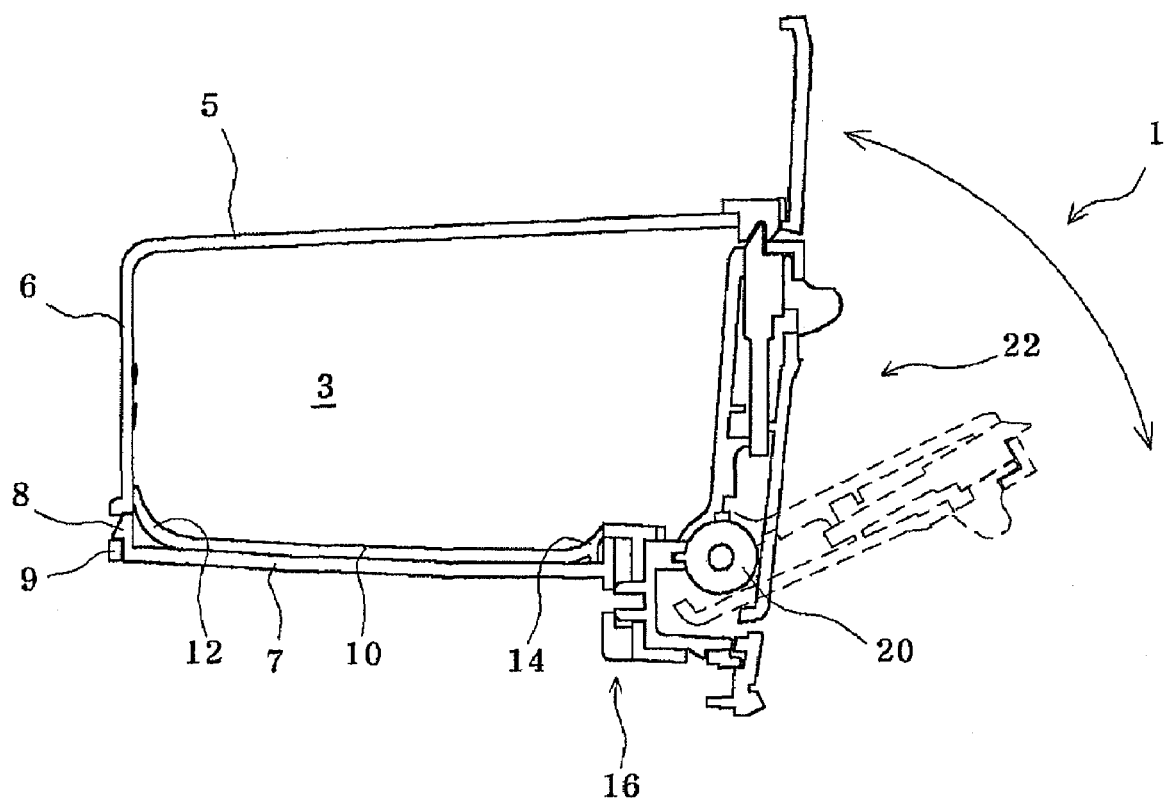
FIG. 1 is a side sectional view illustrating the storage structure of a vehicular tray in accordance with the prior art.
Figure 2:
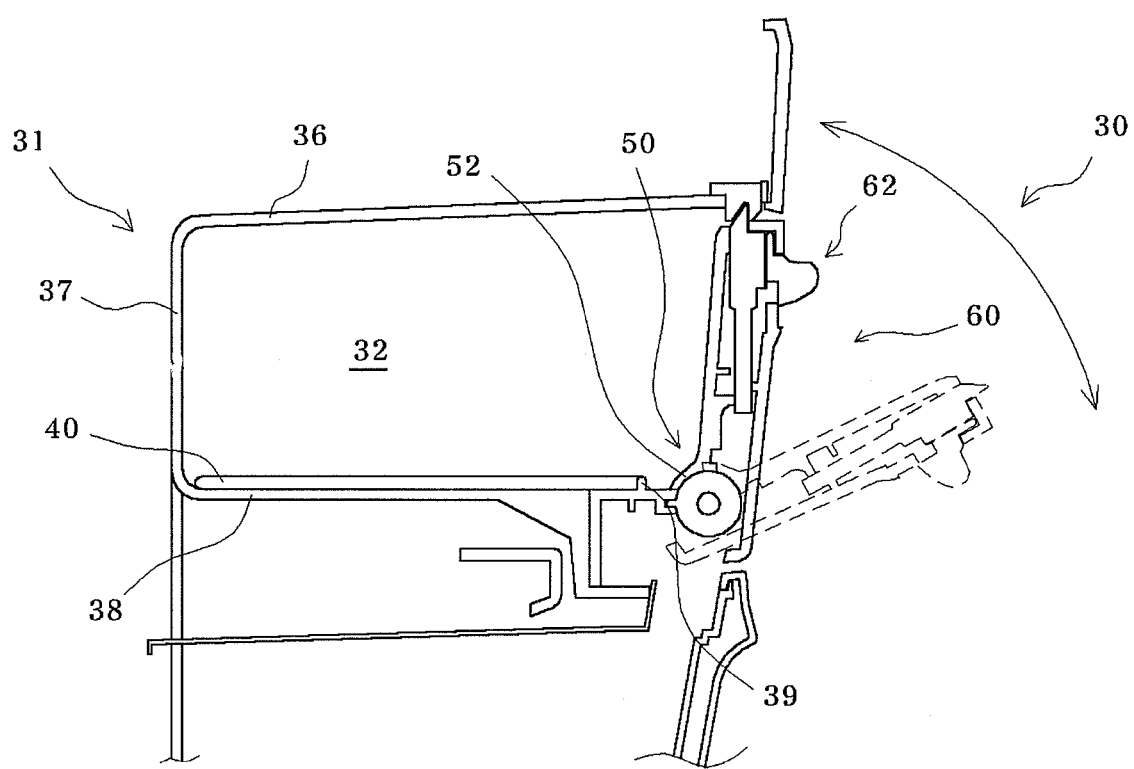
FIG. 2 is a side sectional view illustrating the storage structure of a vehicular tray in accordance with a preferred embodiment of the present invention.

As shown in FIG. 2, illustrating a vehicular tray in accordance with the present invention, the tray, which is designated as reference numeral 30, comprises a housing 31 internally defining a receiving space 32. Here, the housing 31 is an integral unit formed by injection molding.

Explaining the configuration of the housing 31 in detail, the housing 31 comprises an upper panel 36, lateral panel 37, and lower panel 38, and is in the form of a box opened at one surface thereof.

The lower panel 38 has an upwardly-extending protrusion 39 formed at a position thereon near the open surface of the housing 31.

On the lower panel 38 is closely disposed a base-plate 40 taking the form of a flat board for bearing contents thereon. The base-plate 40 is fixed in place by means of the upwardly-extending protrusion 39. Forwardly positioned from the base-plate 40 is a holder unit 50. In the present embodiment, the holder unit 50 has functions of a damper, and a hinge shaft for a cover 60.

The holder unit 50 comprises a holding support 52 configured to protrude upward beyond the lower panel 38, and a spring installed about a hinge shaft. Under operation of the spring, the holder unit 50 serves as a damper in order to adjust an opening or closing operating speed of the cover 60 and keep it at a constant level.

The cover 60, connected to the housing 31 as stated above, has a knob 62 to ensure a secure grip by a user.

Now, the operation and effects of the storage structure for a vehicular tray in accordance with the preferred embodiment of the present invention will be explained.

The upper panel 36, lateral panel 37, and lower panel 38, defining the receiving space 32, are integrally formed by injection molding. On the lower panel 38 is closely disposed the base-plate 40 for bearing certain contents thereon.

The movement of the base-plate 40 on the lower panel 38 is restricted by the upwardly-extending protrusion 39, and the holder unit 50 can function as a hinge shaft when the cover 60 is pivotally rotated to open or close the receiving space 32.

During opening or closing of the cover 60, the holder unit 50 can adjust an operating speed of the cover 60 and keep it at a constant level by using the elasticity of the spring.

Due to the support 52 protruding upward by a prescribed height beyond the lower panel 38, the holder unit 50 can prevent leakage of the contents placed on the base-plate 40 to the outside.

Different from the prior art, wherein side dampers are installed at lateral sides of the tray for adjusting an opening or closing operating speed of the cover, according to the present invention, the holder unit 50 of the cover 60 integrates such a damper therein.

Thereby, there is no need for a separate assembled board, serving as a bracket for the side dampers, between the holder unit 50 and the lower panel 38. This reduces the possibility of deformation of the lower panel 38. As a result, the lower panel 38 may be integrally formed with the lateral panel 37 by injection molding, resulting in reductions in manufacturing costs of overall parts and the number of assembly steps of the parts compared to the prior art.

Further, in the present invention, since the base-plate 40 can be fixed in place using the holding support 52 of the holder unit 50 without additional means for preventing leakage of the contents, the base-plate 40 can take the form of a linear board. This has the effect of expanding the receiving space, and simplifying the shape of a mold used to form the base-plate 40, resulting in a reduction in manufacturing costs.

As apparent from the above description, the present invention provides a storage structure for a vehicular tray which can reduce the number of parts by the provision of a base-plate integrally formed with a housing of the tray, resulting in reductions in manufacturing costs of the parts and the number of assembly steps of the parts.

Further, according to the present invention, through the use of a linear base-plate as well as a holding support of a holder unit serving as a hinge shaft of a cover, it is possible to prevent leakage of contents placed on the base-plate, and to expand a receiving space of the tray, maximizing spatial utility thereof.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A storage structure for a vehicular tray comprising:
   a housing internally defining a receiving space that stores contents, the housing being an integral unit;
   a base plate closely disposed on a lower panel of the housing, and taking the form of a board suitable to bear the contents thereon; and
   a holder including a holding support having a prescribed height suitable to prevent leakage of the contents placed on the base plate, the holder serving as a hinge shaft of a cover opening or closing the receiving space.

2. The structure as set forth in claim 1, wherein the lower panel of the housing has an upwardly-extending protrusion to fix the base plate in place.

* * * * *